(12) United States Patent
Horman et al.

(10) Patent No.: US 8,438,284 B2
(45) Date of Patent: May 7, 2013

(54) NETWORK BUFFER ALLOCATIONS BASED ON CONSUMPTION PATTERNS

(75) Inventors: Neil Horman, Cary, NC (US); Andrew Gospodarek, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 304 days.

(21) Appl. No.: 12/627,657

(22) Filed: Nov. 30, 2009

(65) Prior Publication Data

US 2011/0131328 A1    Jun. 2, 2011

(51) Int. Cl.
*G06F 15/16* (2006.01)
(52) U.S. Cl.
USPC ............ 709/226; 709/209; 709/234; 710/244
(58) Field of Classification Search .................. 709/226, 709/234; 710/244
See application file for complete search history.

(56) References Cited

U.S. PATENT DOCUMENTS

| | | | | |
|---|---|---|---|---|
| 5,159,681 | A * | 10/1992 | Beck et al. | 358/1.17 |
| 6,327,587 | B1 * | 12/2001 | Forster | 1/1 |
| 6,880,022 | B1 * | 4/2005 | Waldspurger et al. | 710/9 |
| 7,337,285 | B2 * | 2/2008 | Tanoue | 711/158 |
| 7,668,923 | B2 * | 2/2010 | Herring et al. | 709/209 |
| 2005/0080945 | A1 * | 4/2005 | Carroll | 710/33 |
| 2005/0081080 | A1 * | 4/2005 | Bender et al. | 714/2 |
| 2007/0204113 | A1 * | 8/2007 | Landry | 711/154 |
| 2007/0294426 | A1 * | 12/2007 | Huang et al. | 709/234 |

* cited by examiner

*Primary Examiner* — Tesfay Yohannes
(74) *Attorney, Agent, or Firm* — Lowenstein Sandler LLP

(57) ABSTRACT

A buffer manager allocates and logs network buffers for a non-uniform memory access (NUMA) machine is described. In one embodiment, the buffer manager receives information about an allocated network buffer. The buffer manager determines the allocation point of the buffer and logs information about the allocation point and a consumption profile information. This logged information is analyzed to determine a per-process buffer consumption profile. The NUMA machine is configured using the buffer consumption profile.

20 Claims, 7 Drawing Sheets

NETWORK BUFFER ALLOCATIONS BASED ON CONSUMPTION PATTERNS

TECHNICAL FIELD

Embodiments of the present invention relate to a method and system for buffer memory allocations. Specifically, embodiments of the invention relate to relate to optimized allocation of network buffers for use in non-uniform access machines.

BACKGROUND

A Non-Uniform Memory Access (NUMA) machine is a computer memory design where the memory access time to memory location depends on that memory's location relative to the processor that is accessing that memory. A NUMA machine typically includes several nodes, where each node is made up of one or more processors, memory local to that node, and a bus interconnecting the node's processors and memory. Another bus, typically a Peripheral Component Interface (PCI) bus interconnects the NUMA nodes. Memory access time for a processor is dependent on whether the processor accesses the memory that is local to that processor or remote. Memory access time to memory that is remote to the processor can take a longer time than memory that is local because for remote memory accesses the contents of the memory is fetched across the bus interconnecting the NUMA nodes.

In a NUMA machine, network buffers can be allocated in any segment of the memory, whether the memory is local or remote. As in known in the art, network buffers are used to buffer data that is received from the network attached to the NUMA machine. Processes running on different NUMA nodes allocate and deallocate network buffers as the process runs. The problem is that the process can run more slowly if the network buffers consumed by that process are allocated using memory on NUMA nodes that are remote to the NUMA node that is running the process.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A buffer manager allocates and logs network buffers for a non-uniform memory access (NUMA) machine is described. In one embodiment, the buffer manager receives information about an allocated network buffer. The buffer manager determines the allocation point of the buffer and logs information about the allocation point and a consumption profile information. This logged information is analyzed to determine a per-process buffer consumption profile. The NUMA machine is configured using the buffer consumption profile.

In another embodiment, the buffer manager allocates network buffers using a bias table. In this embodiment, the buffer manager receives the bias table. A network driver registers receive queues with the network stack. When the buffer manager receives a request for a network buffer for a queue, the buffer manager queries the bias table to determine if there is an entry in the table corresponding to that queue. If there is, the buffer manager allocates a network buffer on a NUMA node corresponding to that entry. If no entry is found, the buffer manager allocates a network buffer on a node that is local to the network interface card using the network buffer.

Figure 1:
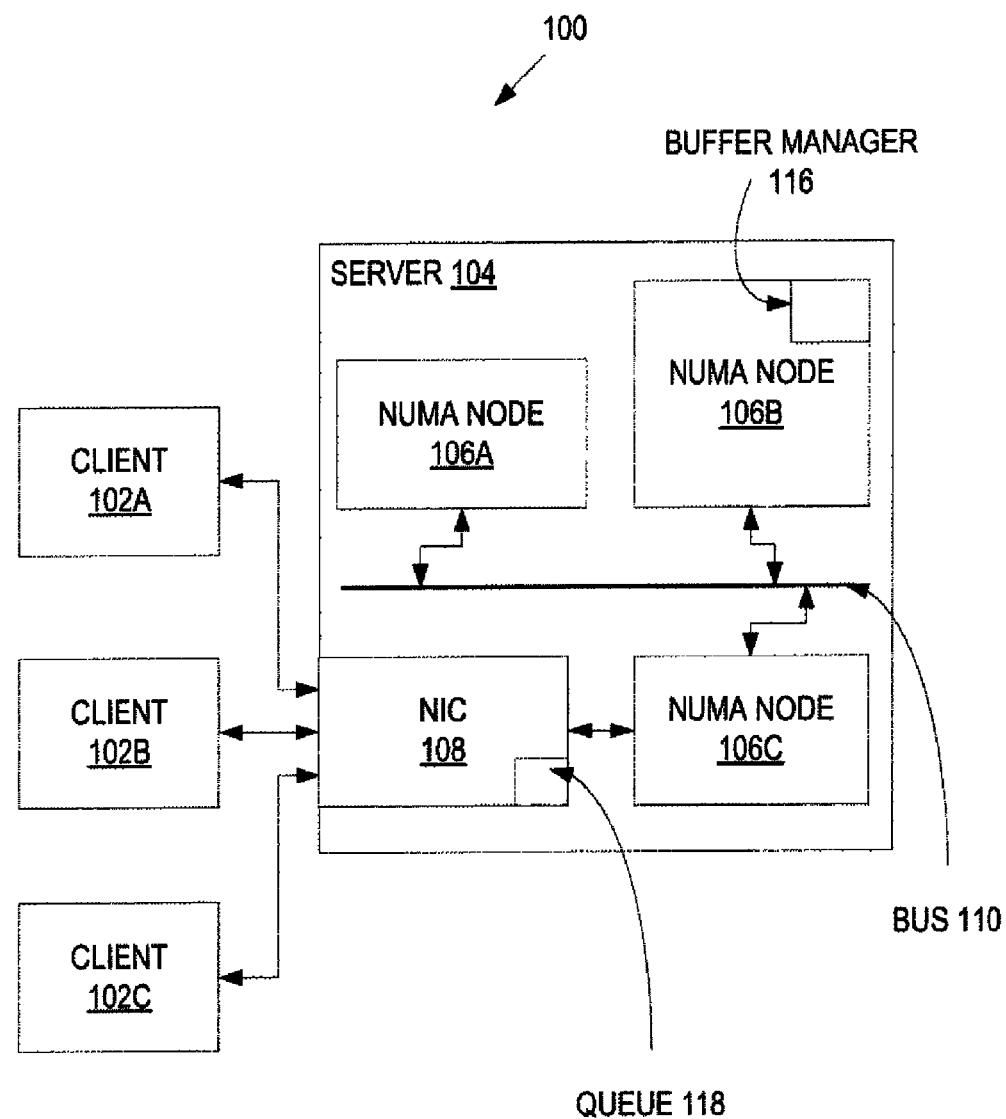
FIG. 1 is a block diagram of one embodiment of a NUMA server coupled to clients that includes a buffer manager.

FIG. 1 is a block diagram of one embodiment of a network 100 that includes NUMA server 104 coupled to clients 102A-C. In one embodiment, clients 102A-C access the services of the NUMA server 104, such as web serving, file serving, email, etc. The NUMA server 104 includes NUMA nodes 106A-C coupled together via a bus 110. In one embodiment, bus 110 is a PCI bus. Furthermore, NUMA server 104 includes a network interface card (NIC) 108 that couples the server to the clients 102A-C. The NIC 108 can be an Ethernet NIC (10/100 Mbps, 1 Gbps, 10 Gbps, etc.), wireless NIC, etc. or any other NIC known in the art. NIC 108 is coupled to bus 110. In one embodiment, NIC 108 includes a queue 118 that is used to receive data frames from a network coupled to NIC 108. Other NUMA nodes 106A-B can access the NIC 108 to transmit and/or receive network data via bus 110. NUMA server 104 further includes a buffer manager 112 that allocates and/or deallocates network buffers for running processes. In one embodiment, buffer manager 112 is running on NUMA node 106B.

As will be described below, each NUMA node 106A-C has local memory, one or more processors, and a bus to interconnect the elements of NUMA node 106A-C. Each of the NUMA nodes can run one of more difference processes, such as web serving, file serving, email, etc.

Figure 2:
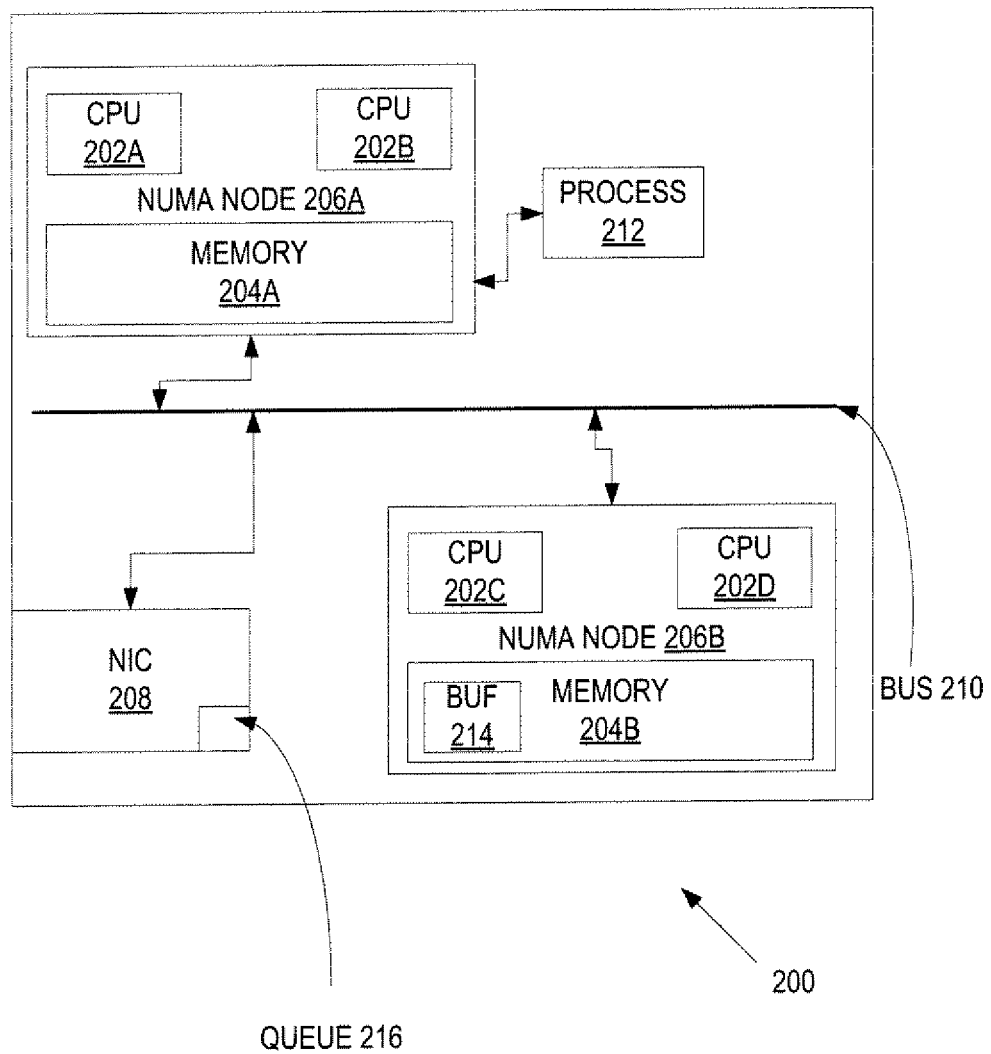
FIG. 2 is a block diagram of one embodiment of a NUMA server that allocates network buffers local to the network interface card.

One problem that can face a NUMA machine is that the memory for processes running on one NUMA node can be allocated from the local memory on another NUMA node. In particular, there is not a mechanism to allocate network buffers on a node that is local to the processor running a process. A network buffer is a piece of memory used to store data that is to be received from the network coupled to a NUMA machine's NIC. FIG. 2 is a block diagram of one embodiment of a NUMA server 200 that allocates network buffers local to the NIC. In FIG. 2, the NUMA server 200 includes NUMA nodes 206A-B coupled to bus 210. In addition, the NIC 208 for NUMA server 200 is coupled to bus 210. In one embodiment, NIC 208 includes a queue 216 that is used to receive data frames from a network coupled to NIC 208. In this embodiment, a process 212 is running on NUMA node 206A that transmits and/or receives data from a network coupled to the NUMA server. To perform the network actions, process 212 uses a network buffer. As described above, a network buffer is a memory buffer that is used to store data used for the network actions. Because the buffer manager 216 of NUMA server 200 allocates the next available memory without regards for the process location, it is possible for the allocated buffer to be allocated in memory that is remote from the requesting NUMA node. For example and in one embodiment, buffer manager 216 allocates a network buffer 214 that is located in the memory 204B of NUMA node 206B for a process 212 running on NUMA node 206A. In this embodiment, the memory access time for process 212 to access network buffer 214 is increased as the memory access is across bus 210. As described above, this increased memory access time can affect the responsiveness of different services, such as web services, etc. The increased memory access times is particular troublesome as network speed increase, such as when NUMA server 200 is coupled to a high-speed network such as a 10 Gbps Ethernet network.

Because of the performance degradation caused by the allocation of network buffers remote to the processes that use these buffers, it would be desirable to allocate the buffers on the same NUMA node that the requesting process is running. In one embodiment, there are two possibilities to increase the likelihood that a process will be allocated in the same NUMA node as the running process. One way is based on empirically determining which processes allocate network buffers on which NUMA nodes. In this embodiment, when a network buffer is allocated, the buffer manager logs the network buffer allocation and the consumption profile information. For example and in one embodiment, the requesting process identification number, NUMA node that process is running, the NUMA node that has the allocated network buffer, interrupt number, and queue identification, and received packet size. A system administrator will use this logged information to determine a per-process buffer consumption profile that can be used to tune the NUMA server. The logging of network buffer allocation is further described in FIG. 4 below.

Figure 3:
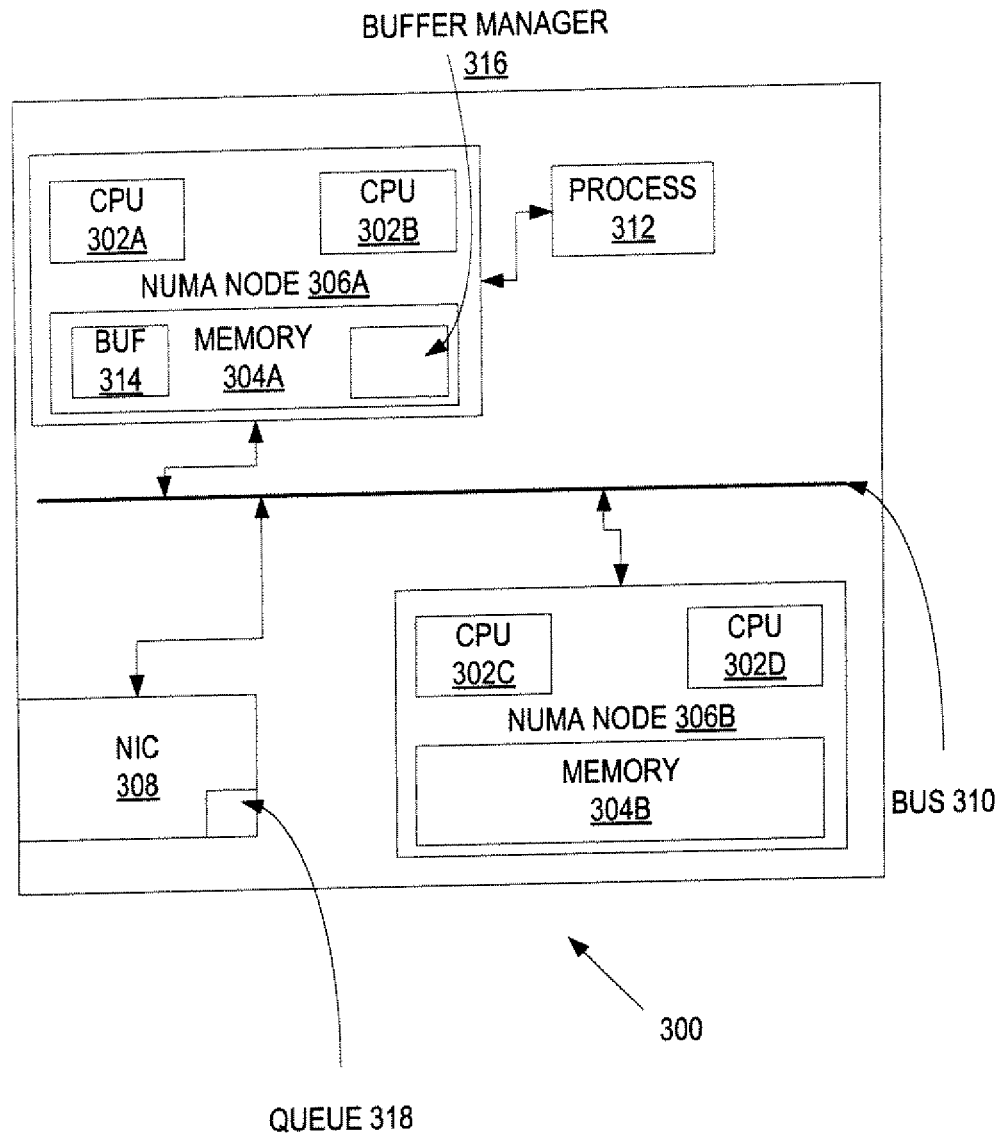
FIG. 3 is a block diagram of one embodiment of a NUMA server that allocates network buffers using a bias table.

In another embodiment, a NUMA machine allocates network buffers based on a bias table. This allows the requesting process to allocate a network buffer on the NUMA node that is running the process. FIG. 3 is a block diagram of one embodiment of a NUMA server 300 that allocates network buffers using a bias table. In FIG. 3, the NUMA server 300 includes NUMA nodes 306A-B coupled to bus 310. In addition, the NIC 308 for NUMA server 300 is coupled to bus 310. In one embodiment, NIC 308 includes a queue 318 that is used to receive data frames from a network coupled to NIC 308. In this embodiment, a process 312 is running on NUMA node 306A that transmits and/or receives data from a network coupled to the NUMA server 300. To perform the network actions, process 312 uses a network buffer. Unlike the NUMA server 200 in FIG. 2, NUMA server 300 allocates a network buffer 314 within the same NUMA node 306A that is running the process 312. In one embodiment, a system administrator configures the NUMA server 306 to allocate network buffers using a bias table. The table based network buffer allocation if further described in FIG. 5 below. In one embodiment, buffer manager 316 receives requests for network buffer and uses a bias table to allocate the requested network buffers.

Figure 4:
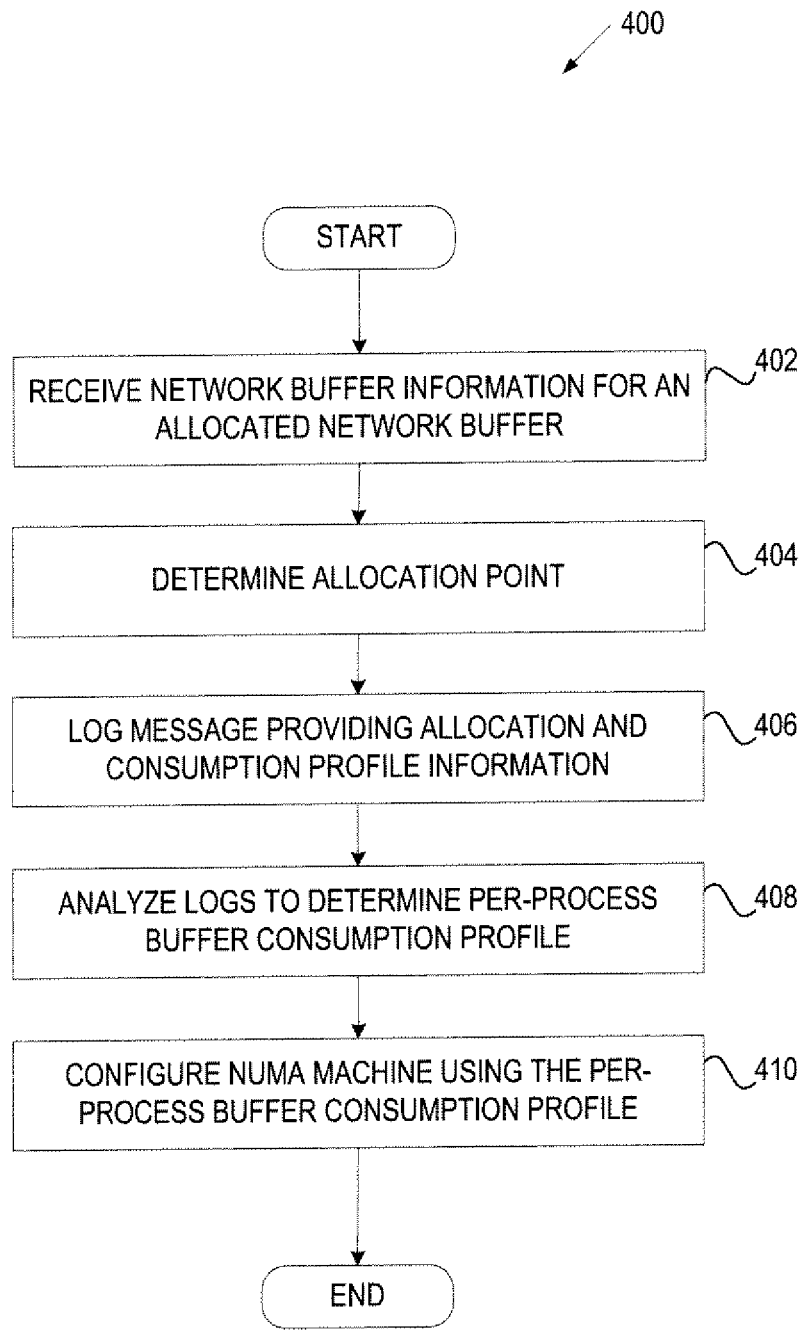
FIG. 4 is a flowchart of one embodiment of a process for logging network buffer allocations to develop a consumption profile.

FIG. 4 is a flowchart of one embodiment of a process for logging network buffer allocations to develop a consumption profile. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a buffer manager, such as buffer manager 316 of FIG. 3.

Referring to FIG. 4, process 400 begins with processing logic receiving network buffer information for an allocated network buffer at block 402. In one embodiment, process 400 receives information such as process identification of the requested the network buffer, the size of the network buffer, receiving process identification, process name, irq doing the receive, NUMA node of buffer, and cpu/numa node of receiving process, destination hash value, etc. In one embodiment, the destination hash value can be used to choose a NUMA node based on packet contents. For example, in one embodiment, traffic destined for port 80 might go to one node and traffic destined for port 443 might go to another node, if the different nodes were running different servers. Process 400 determines the fetcher buffer allocation point at block 404. In one embodiment, the fetcher allocation point is the NUMA node memory location that is used for the allocated network buffer. For example, the fetcher allocation point could be NUMA node 1, 2, 3, etc.

At block 406, process 400 logs a message providing allocation and consumption profile information. While in one embodiment process 400 logs the buffer allocation point and consumption profile information into a human readable text file, in alternative embodiment, process 400 logs this information into another format (database, etc.). In one embodiment, the consumption profile information includes the process identification of the requested network buffer, the size of the network buffer, receiving process identification, process name, irq doing the receive, NUMA node of buffer, and cpu/numa node of receiving process, and/or combination thereof.

At block 400, process 400 reads the log information saved in block 406 to determine a per-process buffer consumption profile. For example and in one embodiment, a NUMA server has two NUMA nodes (NUMA nodes A and B), where each NUMA node has a corresponding NIC coupled to it (NIC A and B). In this example, further consider that on NUMA node A a web server is running and using NIC B and on NUMA node B has a database server running that is using NIC A. In this example, the performance of the NUMA server would be degraded as the network buffers for the web server is in the memory of NUMA node B, whereas the network buffers for the database server is in the memory of NUMA node A. The system administrator, in this example, would configure the NUMA server to have the web server run on NUMA node B and the database server run on NUMA node A. In this example, the NUMA server is tuned to run faster by having the web/database services running on the same NUMA node that has a corresponding network buffer allocated for that process.

At block 410, process 400 configures a NUMA machine using the per-process buffer consumption profile. In one embodiment, a system administrator configures the NUMA machine to run the processes on NUMA nodes that are likely to allocate the network buffers. For example and in one embodiment, and using the example above, the system administrator would configure the NUMA server have the web server run on NUMA node B and the database server run on NUMA node A.

Figure 5:
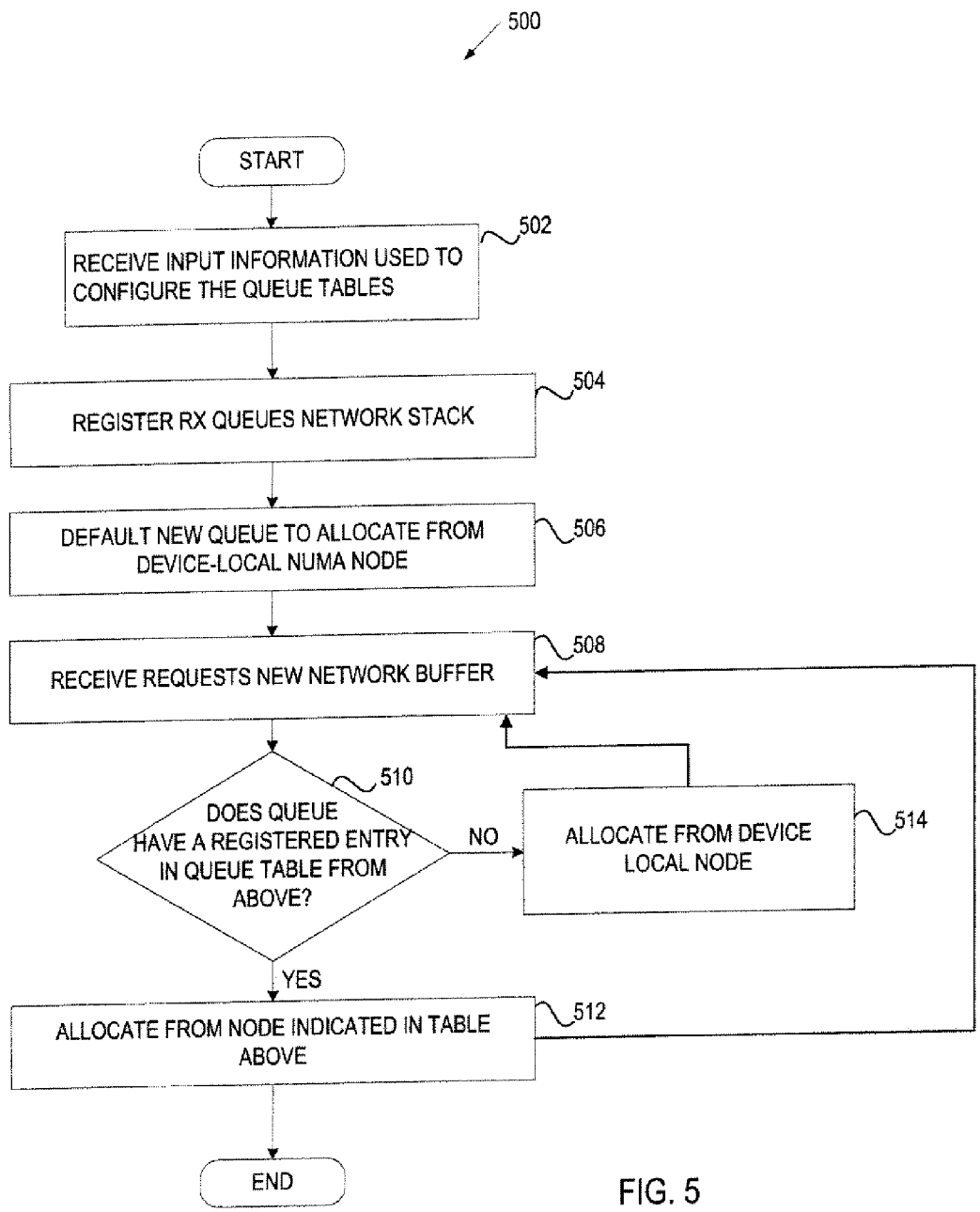
FIG. 5 is a flowchart of one embodiment of a process for allocating a network buffer according to the NUMA node that requests that network buffer.

As described, there are two proposed ways to get around the problem of network buffers being allocated on different NUMA nodes than the process that is consuming that network buffer. The second way is to allocate network buffers based on a bias table. FIG. 5 is a flowchart of one embodiment of a process for allocating a network buffer according to the NUMA node that requests the network buffer. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a buffer manager, such as buffer manager 316 of FIG. 3.

Referring to FIG. 5, process 500 begins with processing logic receiving input information used to configure the bias table for a network stack at block 502. In one embodiment, the network stack is Transmission Control Protocol/Internet Protocol (TCP/IP), Asynchronous Transfer Mode (ATM), or other network stacks as known in the art. In one embodiment, a bias table. In one embodiment, a bias table is in effect a single column database. Each entry in this table holds the NUMA node that network buffers for the corresponding queue in the table should allocated from. Rows are added to the table via a registration call, where each row represents a receive queue with a unique index. For example, in one embodiment, a system administrator may, by means of a user space utility, adjust the preferred NUMA node listed in each row. In this embodiment, when a network card driver goes to replenish network buffers for that queue, this looks up the corresponding index in this bias table for that receive queue and allocates network buffers from the system administer assigned NUMA node.

At block 504, process 500 registers receive queues with the network stack. In one embodiment, the system network driver registers these queues. In one embodiment, network devices can have multiple receive queues.

Process 500 defaults new queues to allocate from device-local NUMA node at block 506. In one embodiment, the default queue would be allocated from the NUMA node that a device (e.g., NIC) is located on. For example and in one embodiment, process 500 would default queue would be on NUMA node 306B for a network queue associated with NIC 308 as illustrated in FIG. 3 above. In another embodiment, the network stack (e.g., TCP/IP, ATM, etc. network stack) defaults this queue. In one embodiment, the default queues are used if the process requesting the queues has not been configured to allocate those queues from a particular NUMA node.

At block 508, process 500 requests a new network buffer for a particular queue. The requested network buffer can be used for the receive queues. In one embodiment, a network queue is a hardware element that represent discrete, parallel receive paths in the hardware. For example, in one embodiment, several network cards that share the work of receiving data, all compressed to use the same chip, and the same physical port exterior to the box. Each receive queue has its own interrupt, and its own receive ring buffer, but it part of the same card, which the network driver is aware of. In this embodiment, ring buffers hold the network buffers for a single receive queue, and are periodically replenished by the driver when a certain number of frames are received. In this embodiment, there is a control path in which a system administrator informs the network card driver that, when replenishing the receive queue's ring buffer with new network buffers, the system should allocate them from a specific NUMA node.

Process 500 determines if a queue associated with the requested buffer has a registered entry in a bias table. In one embodiment, process 500 queries the bias table to determine if that queue has a registered entry in the bias table. If there is an entry in the bias table, process 500 allocates a network buffer on the NUMA node as indicated in the bias table at block 512. For example and in one embodiment, process 500 queries the bias table for NUMA server 300 to fulfill a request for network buffer for process 302. In this embodiment, the network queue for process 312 has a registered entry to allocate a network buffer using the memory 304A of NUMA node 306A as described in FIG. 3 above. Thus, in this embodiment, process 500 allocates a network buffer for the requesting process using the bias table.

If there is not an entry in the bias table, process 500 allocates the network buffer from the memory of the NUMA node that is local to the device at block 514. For example and in one embodiment, process 500 queries the bias table for NUMA server 300 to fulfill a request for network buffer for process 312. In this embodiment, the network queue for process 312 does not have a registered entry in the bias table to allocate a network buffer using the memory 304A of NUMA node 306A. Process 500 allocates a network buffer for the requesting process using default network buffer location, which is the NUMA node local to the device. In this example, process 500 allocates a network buffer from the memory 304B of NUMA node 306B. Execution from either block 512 or block 514 proceeds to block 508.

The processes described in FIGS. 4 and 5 are used to allocate network buffers local to processor running the process requesting the network buffer. Each Figure receives network allocation information that is used to configure the NUMA machine. For FIG. 4, the network buffer allocation information is the logged allocation points and consumption profiles. For FIG. 5, the network buffer allocation information is the bias table. Using this information, each Figure describes configuring a NUMA machine using the network buffer allocation information and allocating network buffers for a process with the network buffer allocation information.

Figure 6A:
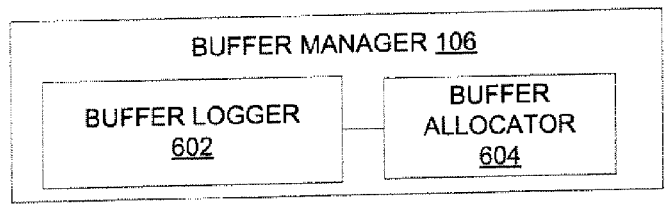
FIG. 6A is a block diagram of a buffer manager that manages the allocation of network buffers.

FIG. 6A is a block diagram of a buffer manager 106 that manages the allocation of network buffers. In one embodiment, buffer manager 106 is a module that manages network buffers of a NUMA server, such as NUMA server 104 as illustrated in FIG. 1. In FIG. 6A, buffer manager 106 comprises buffer logger 602 and buffer allocator 604. Buffer logger 602 logs an allocation of a network buffer and consumption profile information as described in FIG. 4 above. Buffer allocator 604 allocates network buffers based on a bias table as described in FIG. 5 above.

Figure 6B:
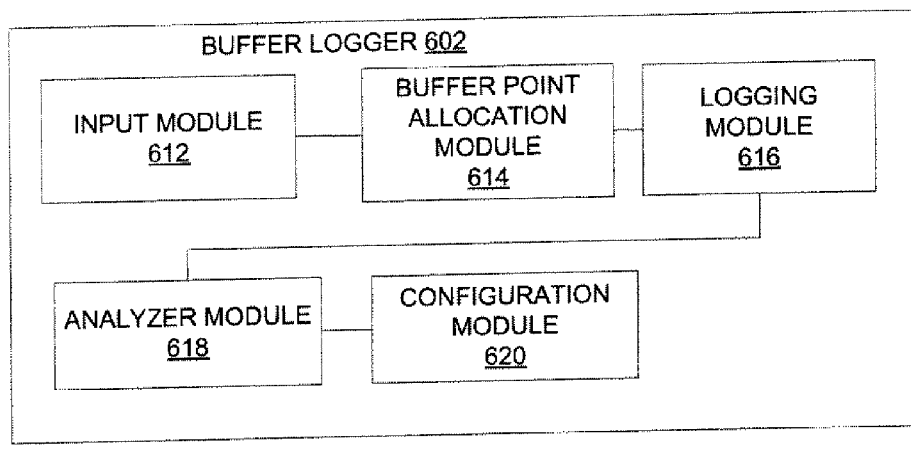
FIG. 6B is a block diagram of a buffer logger that logs the allocation of network buffers.

FIG. 6B is a block diagram of a buffer logger 602 that logs the allocation of network buffers. Buffer logger 602 comprises input module 612, buffer point allocation module 614, logging module 616, analyzer module 618, and configuration module 620. Input module 612 receives network buffer information as described in FIG. 4, block 402. Buffer point allocation module 614 determines the buffer allocation point as described in FIG. 4, block 404. Logging module 616 logs a message providing allocation and consumption point profile information as described in FIG. 4, block 406. Analyzer module 618 analyzes the logs to determine a per-process buffer consumption profile as described in FIG. 4, block 408. Configuration module 620 configures the NUMA machine using the buffer consumption profile as described in FIG. 4, block 410.

Figure 6C:
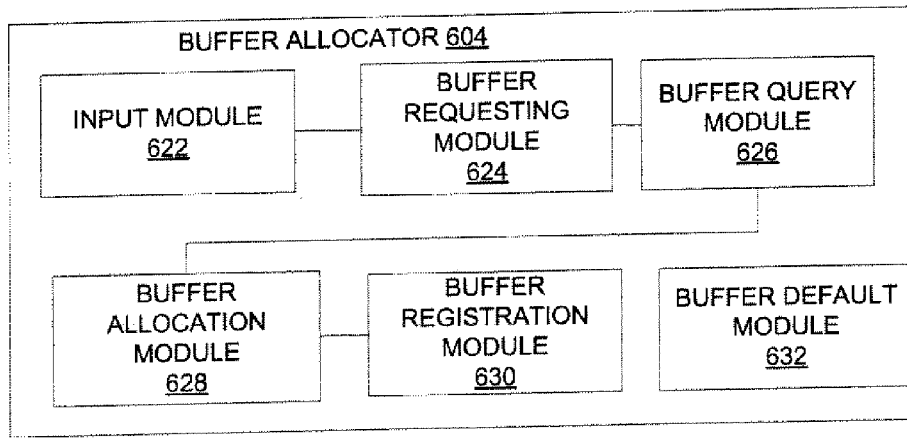
FIG. 6C is a block diagram of a buffer allocator that allocates network buffers.

FIG. 6C is a block diagram of a buffer allocator 604 that allocates network buffers using a bias table. Buffer allocator 604 includes input module 622, buffer requesting module 624, buffer query module 626, buffer allocation module 628, buffer registration module 630, and buffer default module 632. Input module 622 receives the input information used to configure the bias tables as described in FIG. 5, block 502. Buffer requesting module 624 requests new network buffers as described in FIG. 5, block 508. Buffer query module 626 queries the bias table to determine if a requested network buffer has a registered entry as described in FIG. 5, block 510. Buffer allocation module 628 allocates the requested network buffer using either a process specific or device local NUMA node as described in FIG. 5, blocks 512 and 514. Buffer registration module 630 registers receive queues with the network stack as described in FIG. 5, block 504. Buffer default module 532 configures the buffer allocator to allocate default queues from a NUMA node local to a device associated with the requested network buffer as described in FIG. 5, block 506.

Figure 7:
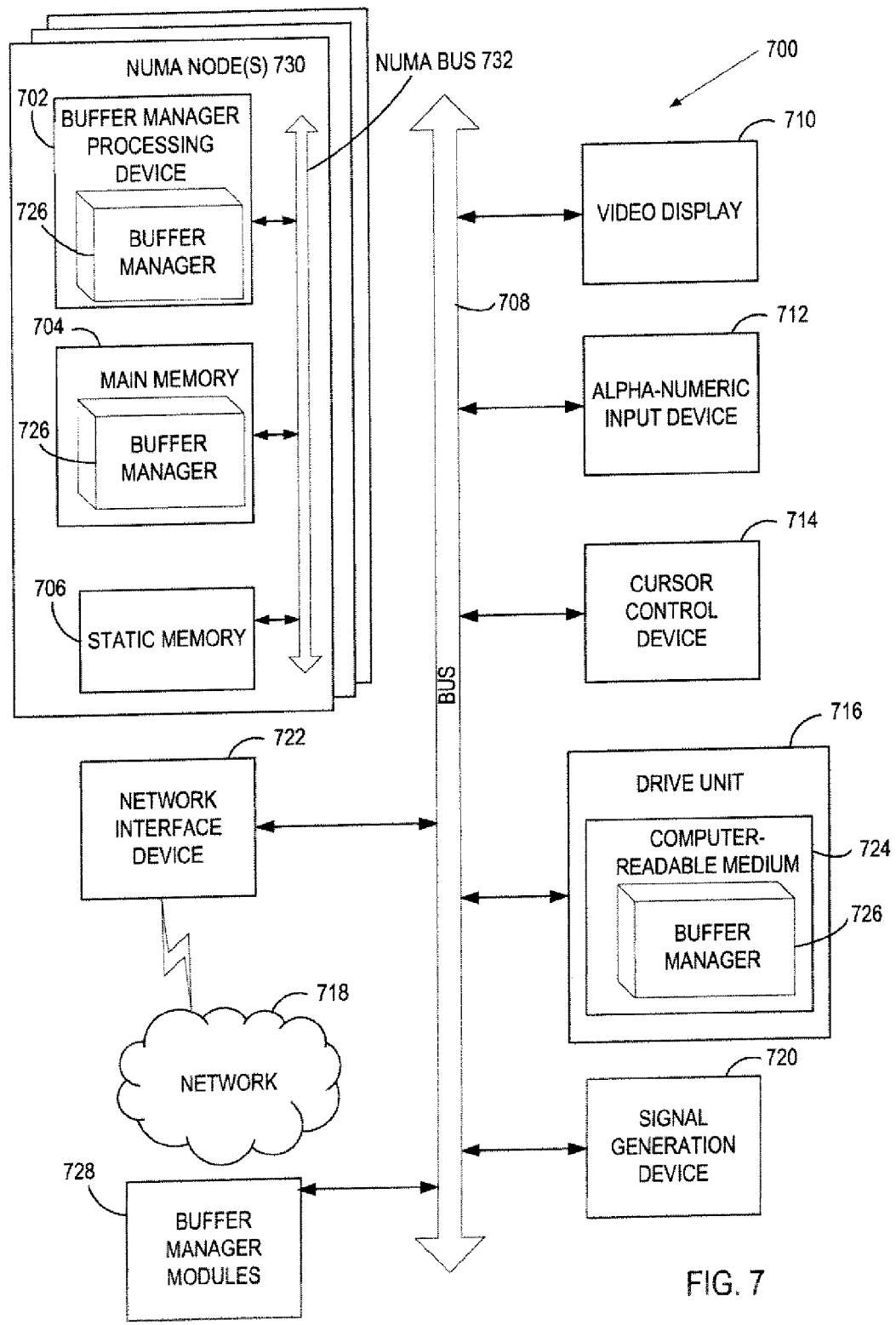
FIG. 7 is a diagram of one embodiment of a computer system that manages allocation of network buffers.

FIG. 7 is a diagram of one embodiment of a computer system for managing network buffers. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., either a client computer or the server computer managing network buffers) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes one of more NUMA nodes 730 and a secondary memory 716 (e.g., a data storage device in the form of a drive unit, which may include fixed or removable computer-readable storage medium), which communicate with each other via a bus 708. In one embodiment, a NUMA node is one of the NUMA nodes 206A-B described in FIG. 2. Each NUMA node 730 includes a buffer manager processing device 702, a main memory 704 (e.g., read-only memory (ROM), flash memory, dynamic random access memory (DRAM) such as synchronous DRAM (SDRAM), etc.), and a static memory 706 (e.g., flash memory, static random access memory (SRAM), etc.)

Buffer manager processing device 702 represents one or more general-purpose processing devices such as a microprocessor, central processing unit, or the like. More particularly, the buffer manager processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Test controlling processing device 702 may also be one or more special-purpose processing devices such as an application specific integrated circuit (ASIC), a field programmable gate array (FPGA), a digital signal processor (DSP), network processor, or the like. Buffer manager processing device 702 is configured to execute the buffer manager 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium) 724 on which is stored one or more sets of instructions (e.g., the buffer manager 726) embodying any one or more of the methodologies or functions described herein. The buffer manager 726 may also reside, completely or at least partially, within the main memory 704 and/or within the buffer manager processing device 702 during execution thereof by the computer system 700, the main memory 704 and the buffer manager processing device 702 also constituting machine-readable storage media. The buffer manager 726 may further be transmitted or received over a network 718 via the network interface device 722.

The computer-readable storage medium 724 may also be used to store the buffer manager 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The buffer manager modules 728, components and other features described herein (for example in relation to FIG. 1) can be implemented as discrete hardware components or integrated in the functionality of hardware components such as ASICS, FPGAs, DSPs or similar devices. In addition, the buffer manager modules 728 can be implemented as firmware or functional circuitry within hardware devices. Further, the buffer manager modules 728 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "configuring," "allocating," "querying," "logging," "determining," "analyzing," "instantiating," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for managing network buffers been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving, by a non-uniform memory access machine, network buffer allocation information, wherein the non-uniform memory access machine comprises a plurality of nodes, and wherein each of the nodes has a respective local memory, and wherein the network buffer allocation information associates at least one of the nodes with a respective queue;
   selecting by the non-uniform memory access machine, based on the network buffer allocation information, a node from the plurality of nodes at which to allocate a network buffer in the local memory of the node; and
   allocating, by the non-uniform memory access machine, the network buffer at the selected node.

2. The method of claim 1, wherein the network buffer allocation information associates the at least one of the nodes with the respective queue via an entry in a bias table.

3. The method of claim 2, wherein the method further comprises receiving a request for a network buffer for a queue, and wherein the selecting is based on the bias table.

4. The method of claim 3, wherein when the bias table does not have an entry corresponding to the queue, the selected node is local to a device that uses the network buffer.

5. The method of claim 4, wherein the device is a network interface card.

6. The method of claim 3, wherein the request is for a receive queue.

7. The method of claim 1, wherein the network buffer allocation information comprises a log, and wherein the log comprises one or more network buffer allocation points and consumption profile information.

8. The method of claim 7, further comprising:
   determining an allocation point for an allocated network buffer;
   writing the allocation point and consumption profile information to the log; and
   determining a per-process buffer consumption profile based on the log.

9. The method of claim 7, further comprising:
   instantiating a process based on the log.

10. A non-transitory computer readable storage medium having instructions stored thereon that, when executed by a computer system, cause the computer system to perform a method comprising:
    receiving, by the computer system, network buffer allocation information for a non-uniform memory access machine, wherein the non-uniform memory access machine comprises a plurality of nodes, and wherein each of the nodes has a respective local memory, and wherein the network buffer allocation information associates at least one of the nodes with a respective queue;
    selecting, machine, based on the network buffer allocation information, a node from the plurality of nodes at which to allocate a network buffer in the local memory of the node; and
    allocating, by the computer system, the network buffer at the selected node.

11. The non-transitory computer readable storage medium of claim 10, wherein the network buffer allocation information associates the at least one of the nodes with the respective queue via an entry in a bias table.

12. The non-transitory computer readable storage medium of claim 11, wherein the method further comprises receiving a request for a network buffer for a queue, and wherein the selecting is based on the bias table.

13. The non-transitory computer readable storage medium of claim 12, wherein when the bias table does not have an entry corresponding to the queue, the selected node is local to a device that uses the network buffer.

14. The non-transitory computer readable storage medium of claim 12, wherein the request is for a receive queue.

15. The non-transitory computer readable storage medium of claim 10, wherein the network buffer allocation information comprises a log, and wherein the log comprises one or more network buffer allocation points and consumption profile information.

16. The non-transitory computer readable storage medium of claim 15, wherein the method further comprises:
    determining an allocation point for an allocated network buffer;
    writing the allocation point and consumption profile information to the log; and
    determining a per-process buffer consumption profile based on the log.

17. The non-transitory computer readable storage medium of claim 15, wherein the method further comprises:
instantiating a process based on the log.

18. A non-uniform memory access machine comprising:
a first node comprising a first local memory; and
a second node coupled to the first node, wherein the second node comprises a second local memory, and wherein the second node is to:
receive network buffer allocation information that associates the first node with a respective queue,
select, based on the network buffer allocation information, a node of the non-uniform memory access machine at which to allocate a network buffer in its local memory, and
allocate the network buffer at the selected node of the non-uniform memory access machine.

19. The non-uniform memory access machine of claim 18, wherein the network buffer allocation information associates the first node with a respective queue via an entry in a bias table, and wherein the second node comprises:
an input module to receive the bias table;
a buffer requesting module to receive a request for a network buffer for a queue in the non-uniform memory machine;
a buffer query module to query the bias table to determine whether there is an entry corresponding to the queue; and
a buffer allocation module to allocate, when the bias table has an entry corresponding to the queue, a network buffer on the node indicated by the entry.

20. The non-uniform memory access machine of claim 18, wherein the second node comprises:
an input module to receive network buffer information for an allocated network buffer;
a buffer point allocation module to determine an allocation point for the allocated network buffer;
a logging module, coupled to the input module, to write allocation and consumption profile information to a log; and
an analyzer module to determine a per-process buffer consumption profile based on the log.

* * * * *